United States Patent [19]
Lutz

[11] Patent Number: 5,889,207
[45] Date of Patent: Mar. 30, 1999

[54] MICROMECHANICAL RATE OF ROTATION SENSOR HAVING RING WITH DRIVE ELEMENT AND DETECTION ELEMENT

[75] Inventor: Markus Lutz, Reutlingen, Germany

[73] Assignee: Robert Bosch GmbH, Stuttgart, Germany

[21] Appl. No.: 839,660

[22] Filed: Apr. 15, 1997

[30] Foreign Application Priority Data

May 3, 1996 [DE] Germany .................. 196 17 666.2

[51] Int. Cl.$^6$ ............................................. G01P 9/04
[52] U.S. Cl. ................................. 73/504.13; 73/504.12
[58] Field of Search .................... 73/504.13, 504.12, 73/504.02, 1.38, 1.86, 504.01, 504.18; 361/292

[56] References Cited

FOREIGN PATENT DOCUMENTS 0 461 761   12/1991   European Pat. Off. .

Primary Examiner—Christine K. Oda
Attorney, Agent, or Firm—Kenyon & Kenyon

[57] ABSTRACT

A rate of rotation sensor is structured as a micromechanical component on the surface of a substrate. The rate of rotation sensor has a ring with drive elements and detection elements. The ring is made to oscillate by means of the drive elements, and the deformation of the ring which results from Coriolis forces is detected by the detection elements.

9 Claims, 3 Drawing Sheets

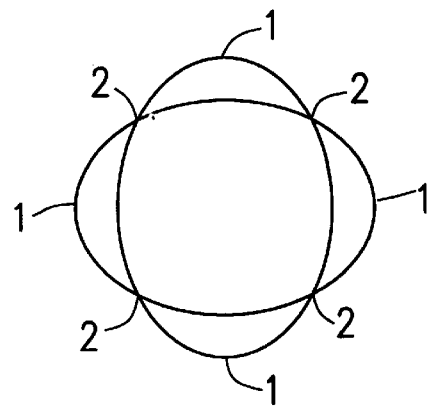
FIG. 1
PRIOR ART
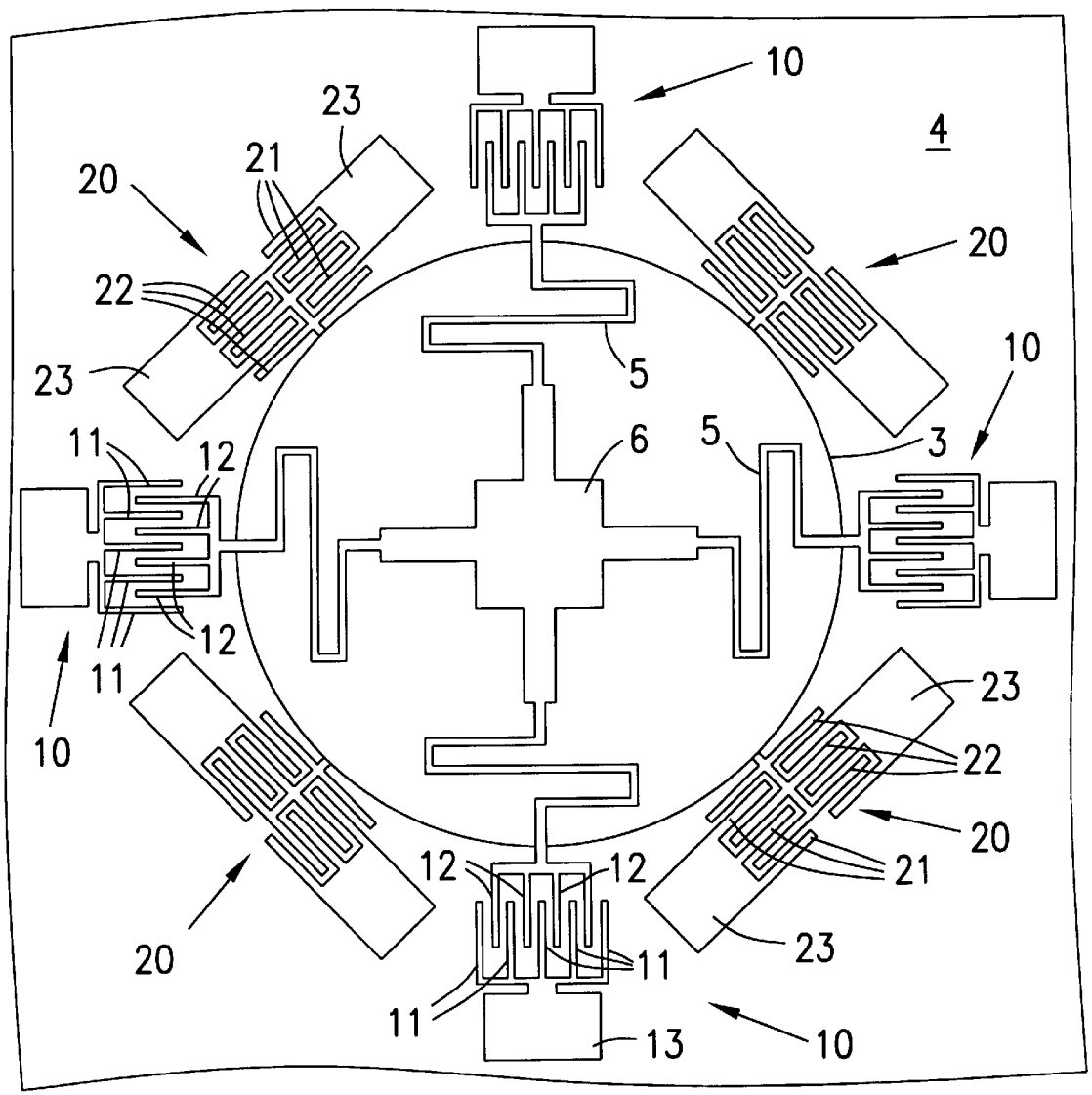
FIG. 2
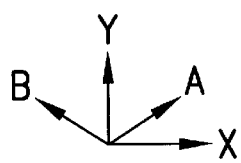

5,889,207

MICROMECHANICAL RATE OF ROTATION SENSOR HAVING RING WITH DRIVE ELEMENT AND DETECTION ELEMENT

BACKGROUND INFORMATION

A micromechanical rate of rotation sensor is described in European Patent No. EP 461 761, which has a ring structure which can be excited to produce oscillations. The oscillation nodes are shifted by rotating the ring about its central axis. Detection elements which detect this shift are arranged in the oscillation nodes. The ring structure is formed out of a plate-shaped element, where the oscillating part is connected with the rest of the plate structure by means of spring elements. The plate structure can then be arranged between additional plates, in order to form means for exciting the oscillations or means for detecting the shift in the oscillation nodes.

SUMMARY OF THE INVENTION

The sensor according to the present invention has the advantage that the ring, the means for excitation, and the detection elements-are produced together, in the same production process. Because of this simultaneous production, the production costs are reduced. Furthermore, the relative dimensions between the individual elements are established by one and the same production process, which makes it possible to achieve closer tolerances. Furthermore, the sensors according to the present invention can be produced in large numbers, by means of parallel production processes.

It is practical if excitation of the oscillations, or detection of the shift in the oscillation nodes, takes place by means of capacitative elements. For this purpose, movable electrodes are provided on the ring, and fixed electrodes on the substrate. The fixed electrodes are each connected with the substrate by means of bearing blocks. The bearing blocks can be insulated from the substrate, to be completely dielectric. Furthermore, an insulation layer used in this way can also be used as a reactive layer for the ring structure, oscillation springs, and movable electrodes. By using monocrystalline silicon material, it is possible to create rate of rotation sensors which are not subject to any kind of aging process. It is particularly easy to produce polysilicon elements.

BRIEF DESCRIPTION OF THE DRAWINGS

FIG. 1 shows a schematic view of an oscillating ring structure.

FIG. 2 shows a first exemplary embodiment of a rate of rotation sensor according to the present invention.

DETAILED DESCRIPTION

Figure 3:
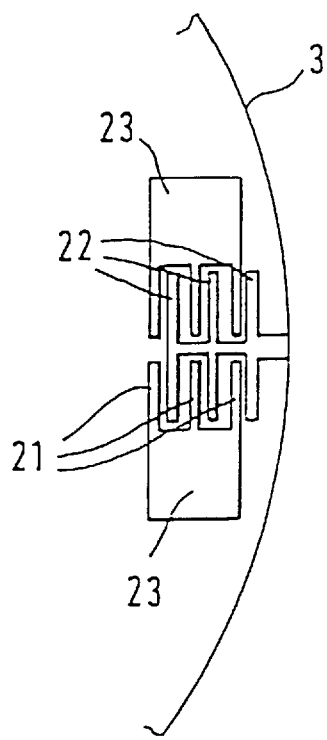
FIG. 3 shows a second exemplary embodiment of a rate of rotation sensor according to the present invention.

FIG. 1 schematically shows an oscillating ring, which oscillates in a first oscillation mode. In this connection, the ring, which is completely circular at first, is deformed in such a way that two opposite sides move away from one another, and the opposite sides which are offset from the first sides by 90° come closer to one another. The deformation of the second half-phase of the oscillation corresponds to the first half-phase, but now the deformation occurs rotated by 90°. As is evident, the ring structure has four oscillation bulges 1 and four oscillation nodes 2. The maximum excursions of the ring structure occur at the oscillation bulges in each instance, while the ring structure is changed only slightly at the oscillation nodes. If such an oscillating ring structure is rotated about its central axis, additional forces occur because of the Coriolis acceleration which is caused by this, and these forces shift the location of the oscillation nodes. Therefore, excursions also occur at these locations, and they are a measure of the rotation. This effect is utilized by the rate of rotation sensor according to the present invention.

FIG. 2 shows a top view of an embodiment of a sensor according to the present invention. A freely movable ring 3 has been produced on a substrate 4, and this ring is suspended on a central bearing block 6 by means of oscillation springs 5. The central bearing block 6 is anchored on the substrate 4 in a fixed position, while the oscillation springs 5 and the ring 3 are at a distance from the substrate 4 and are freely movable.

Around the ring, offset by 90° in each instance, there are four drives 10. Furthermore, four detection elements 20 are provided, which are all at an angle of 90° relative to one another, seen from the center of the ring 3. Proceeding from the center point, the drives 10 are arranged offset by 45° from the detection elements 20 in each instance. FIG. 2 also shows two right-angle coordinate systems XY and AB, which can be assigned to the drives 10 and the detection elements 20 in each instance. Seen from the center point of the ring 3, the drives lie in the positive and negative X and Y direction, and the detection elements lie in the positive and negative A and B direction. Each drive has fixed electrodes 11 and movable electrodes 12. The fixed electrodes 11 are anchored to the substrate 4 by means of bearing blocks 13. The movable electrodes 12 are attached to the ring 3.

Each detection element 20 has fixed electrodes 21 and movable electrodes 22. The fixed electrodes 21 are connected with the substrate 4 on bearing blocks 23. The movable electrodes 22 are attached to the ring 3. The movable electrodes 12, 22 of the drive 10 and the detection element 20 can be moved together with the ring 3 in each instance. The fixed electrodes 11, 21 are each rigidly connected with the substrate, by means of the bearing blocks 13, 23, and therefore cannot move.

The device according to FIG. 2 is caused to oscillate by applying electrical voltages to the drives 10. For this purpose, voltage is alternately applied to opposite drives 10, causing the movable electrodes 12 to be drawn into the fixed electrodes 11. In this connection, the opposite drives 10 are always driven at the same time, for example first the drives in the positive and negative Y direction, and during the next half-oscillation, the drives in the positive and negative X direction. If this excitation in the inherent oscillation of the ring 3 takes place for the first basic oscillation which was explained in FIG. 1, the first inherent oscillation of the ring 3 is excited. During this oscillation, the movable electrodes 22 of the detection elements 20 are each connected with the ring 3 at oscillation nodes, so that no noticeable excursions of the movable electrodes 22 of the detection elements 20 take place. If, however, a rotation of the sensor takes place about an axis which is perpendicular to the substrate 4, the oscillation nodes of the ring 3 are shifted, and the movable electrodes 22 of the detection elements 20 are shifted relative to the fixed electrodes 21. This shift can be detected by a capacity measurement between the movable electrodes 22 and the fixed electrodes 21, and is a measure of the rotation of the substrate 4.

Of course, other arrangements of drive 10 and detection element 20 are possible. FIG. 3 shows another example of a detection element 20, in which, however, the fixed electrodes 21, the movable electrodes 22, and the bearing blocks 23 are arranged on the inside of the ring. With this arrangement, the space required for the sensor can be reduced. Likewise, drive elements 10 can also be arranged on the inside of the ring 3, or the oscillation beams 5 can be arranged outside the ring 3, for example.

Figure 4:
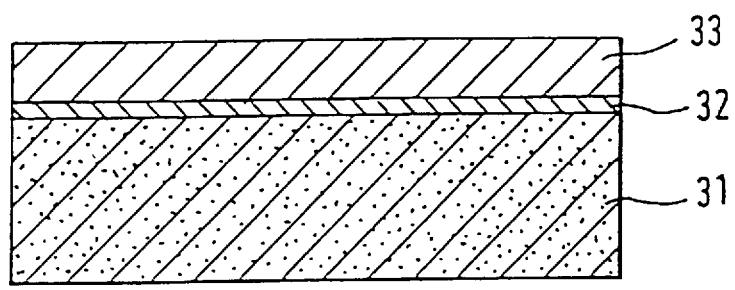
FIG. 4 illustrates a first step of a first method for producing a rate of rotation sensor according to the present invention.
Figure 5:
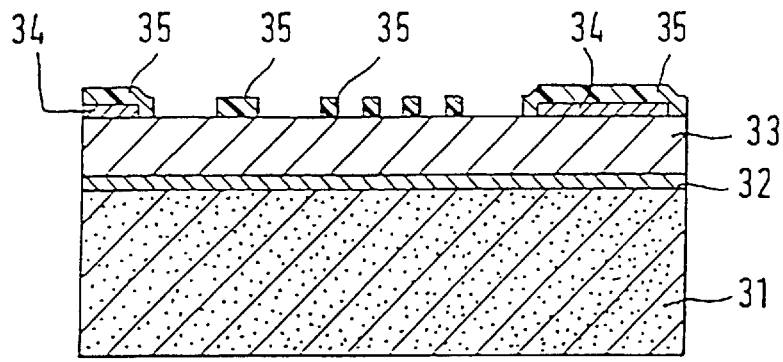
FIG. 5 illustrates a second step of the first production method.
Figure 6:
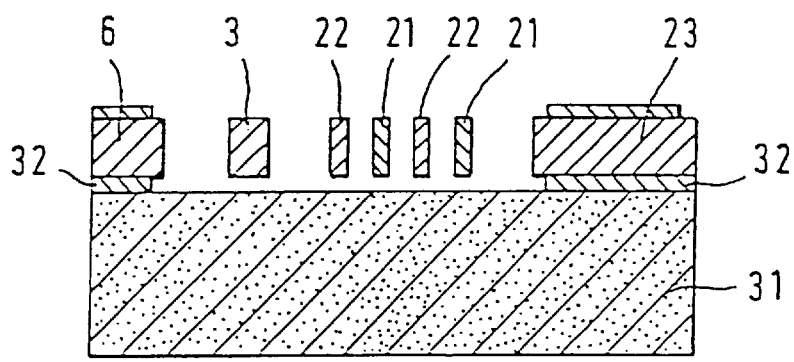
FIG. 6 illustrates a third step of the first production method.

In FIGS. 4, 5, and 6, a first production method for the sensors is explained. The method proceeds from a so-called SOI structure (silicon on insulator), in which an insulation layer 32 is applied to a silicon substrate 31, and a silicon layer 33 is applied on top of the former. As a rule, the silicon substrate 31 has a thickness of several hundred micrometers, the insulation layer has a thickness of several micrometers, and the silicon layer 33 has a thickness of several hundred micrometers to several ten micrometers. Typical dimensions would be 500 micrometers for the silicon substrate 31, 2 micrometers for the insulation layer 32, and 15 micrometers for the silicon substrate 33.

Such a structure can be produced in different ways. By connecting two silicon wafers by means of an insulation layer located between them, and making one of the silicon wafers thinner, it is possible to create a structure such as that shown in FIG. 4. The silicon layer 33 will then be composed of monocrystalline silicon. This material is particularly suitable for the production of mechanical structures which are subjected to bending stress, since no aging process caused by bending occurs for monocrystalline materials. Another possibility of producing the structure according to FIG. 4 is to first deposit an insulation layer on a silicon wafer, and then deposit a polysilicon layer on the insulation layer. If the polysilicon layer is deposited in an apparatus which is normally used for epitaxial layers, large layer thicknesses on the order of several ten micrometers can also be achieved by this. The insulation layer 32 is preferably composed of silicon dioxide ($SiO_2$), silicon nitrite ($Si_3N_4$), or a mixture of both materials. It is also possible to deposit the insulation layer 32 not on the entire surface of the silicon substrate 31, but rather not to cover the surface of the substrate 31 in certain areas, particularly the areas in which a bearing block 13, 23, 6 is supposed to be connected with the substrate. In this case, however, an insulation between the substrate 31 and the silicon layer 33, for example by means of using different types of doping substances, should be ensured.

In another step, a metal layer 34 is then applied and structured. This is done particularly where bearing blocks are provided, which are then supposed to be contacted with bond wires. Afterwards, an etch masking 35 is applied, which can consist of a photo varnish, for example. This etch masking 35 contains the structures for the sensor, as it is shown in a top view in FIG. 2.

The structure of the etching mask 35 is then etched into the top silicon layer 33 by etching. The etching process is continued until the insulation layer 32 has been exposed. In a subsequent etching step, the insulation layer 32 is then etched. This condition is shown in FIG. 6. FIG. 6 shows a cross-section through a ring 3, a central bearing block 6, fixed electrodes 21, movable electrodes 22, and a bearing block 23, as an example. However, the distances between the individual elements are shown in distorted manner, in order to make the representation simpler. As is evident in the cross-section of FIG. 6, the bearing block 6 and the bearing block 23 are rigidly connected with the silicon substrate 31, by the insulation layer 32, while there is no insulation layer 32 at all arranged under the ring 3 and the electrodes 21, 22 any longer. This is achieved in that the geometric dimensions of the ring 3 and the electrodes 21, 22 are comparatively small in comparison with those of the bearing blocks 6, 23. The isotropic etching process of the insulation layer 32 is stopped after a predetermined time, so that the structures with a small lateral expanse, such as the ring 3 and electrodes 21, 22, are completely undercut, while the bearing regions 6, 23, which have a large lateral expanse, are only slightly undercut. In this way, a complex rate of rotation sensor can be produced using a simple production process, which requires only a few mask planes. It is particularly advantageous, in this connection, that the relative distances of all the elements of the sensor can be defined with a single mask step. In this way, it is possible to achieve particularly well reproducible distances.

Figure 7:
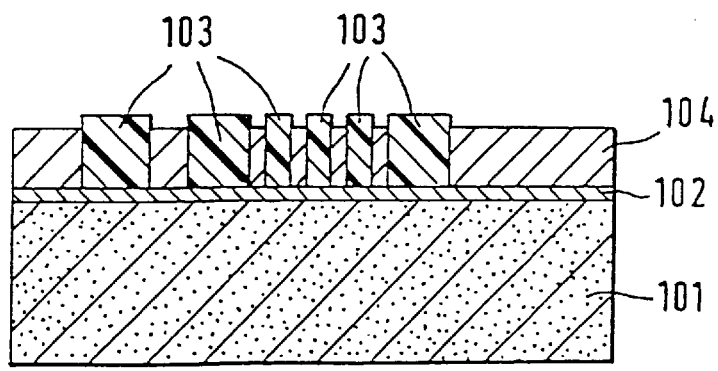
FIG. 7 illustrates a second method for producing a rate of rotation sensor according to the present invention.

FIG. 7 explains a second production method according to the present invention. This method proceeds from an insulating substrate 101, on which a metal layer 102 is applied. Afterward, a layer 103 which can be structured is applied to the metal layer 102, and it is structured. The structure applied to the layer 103 corresponds to the top view of the sensor, as it is shown in FIG. 2. Wherever sensor elements are located, the layer 103 which can be structured is removed. Structuring of the layer 103 takes place until the metal layer 102 under it is exposed. By means of a galvanic deposition process which starts on the metal layer 102, the cavities formed in the layer 103 which can be structured are then filled with a metal, for example nickel. This deposition is stopped before the metal layer grows beyond the layer 103 which can be structured. The metal structures 104 formed in this way therefore form all the elements of the sensor shown in FIG. 2, but during this process step they are still embedded in the layer 103 which can be structured. This condition, which represents an intermediate step of the production process, is shown in FIG. 7. In another step, the layer 103 which can be structured is then completely removed. By means of an etching process which does not attack the metal structures 104, but etches the metal layer 102 which lies below them, undercutting of the individual metal structures 104 can then take place in equivalent manner as described for FIGS. 5 and 6. Because of the different size of the lateral dimensions, and stopping the etching at the right time, the result achieved is that again, only the sensor structures which are supposed to be movable are undercut.

For the insulating substrate 101, not only ceramic materials but also silicon wafers with a surface insulation layer can be used. The metal layer 102 should be selected in such a way that it can be selectively etched relative to the material of the metal structures 104. If nickel is used for the metal structures 104, the metal layer 102 can be composed of copper, for example. Alternatively, it is also possible to use plastic layers with a thin surface metal layer instead of the metal layer 102. For the layer 103 which can be structured, it is possible to use a photo varnish, a varnish which can be structured using X-rays, or other layers which can be structured using plasma processes.

What is claimed is:

1. A micromechanical rate of rotation sensor, comprising:
a substrate having a surface;

a ring including oscillation springs;

an arrangement exciting oscillations in the ring, the oscillations having oscillation bulges and oscillation nodes;

at least one detection element arranged in the oscillation nodes for detecting a shift in the oscillation nodes caused by a rotation; and a bearing block fixed to the substrate, wherein the oscillation springs are suspended on the bearing block, wherein the ring, the arrangement and the at least one detection element are formed as micromechanical elements on the surface of the substrate and have a same height above the surface of the substrate, and wherein the arrangement includes a plurality of movable electrodes and a plurality of fixed electrodes arranged opposite and parallel to one another, the movable electrodes are connected to the ring, the fixed electrodes are connected to the substrate, and an oscillating voltage is applied between the fixed electrodes and the movable electrodes to pull the movable electrodes toward the fixed electrodes.

2. The sensor according to claim 1, wherein the bearing block connects the fixed electrodes to the substrate.

3. The sensor according to claim 1, wherein the oscillation springs suspend the ring on the bearing block.

4. The sensor according to claim 1, wherein the substrate includes silicon, and further comprising an insulating layer coupling the bearing block to the substrate.

5. The sensor according to claim 1, wherein the ring, arrangement and the at least one detection element include monocrystalline silicon.

6. The sensor according to claim 1, wherein the ring, the arrangement and the at least one detection element include polycrystalline silicon.

7. The sensor according to claim 1, wherein the substrate includes an insulating material, and wherein the ring, the arrangement and the at least one detection element include a metal.

8. A micromechanical rate of rotation sensor, comprising:

a substrate having a surface;

a ring including oscillation springs;

an arrangement exciting oscillations in the ring, the oscillations having oscillation bulges and oscillation nodes;

at least one detection element arranged in the oscillation nodes for detecting a shift in the oscillation nodes caused by a rotation; and a bearing block fixed to the substrate, wherein the oscillation springs are suspended on the bearing block, wherein the ring, the arrangement and the at least one detection element are formed as micromechanical elements on the surface of the substrate and have a same height above the surface of the substrate, wherein the at least one detection element includes a plurality of detection elements, the detection elements include a plurality of movable electrodes and a plurality of fixed electrodes arranged opposite to one another, the movable electrodes are connected to the ring, the fixed electrodes are connected to the substrate, and a capacitive signal is measured between the fixed electrodes and the movable electrodes, and wherein the fixed electrodes are arranged parallel to each other, and the movable electrodes are arranged parallel to each other.

9. The sensor according to claim 8, wherein the bearing block connects the fixed electrodes to the substrate.

* * * * *